Sept. 25, 1945.  E. BLAIR  2,385,491
TUBE TESTING APPARATUS
Filed March 27, 1943  6 Sheets-Sheet 1

Inventor
EMILE BLAIR
per
Attorney

Sept. 25, 1945.  E. BLAIR  2,385,491

TUBE TESTING APPARATUS

Filed March 27, 1943  6 Sheets-Sheet 4

Inventor
per EMILE BLAIR
Attorney

Inventor
per EMILE BLAIR
Attorney

Sept. 25, 1945.  E. BLAIR  2,385,491
TUBE TESTING APPARATUS
Filed March 27, 1943  6 Sheets-Sheet 6
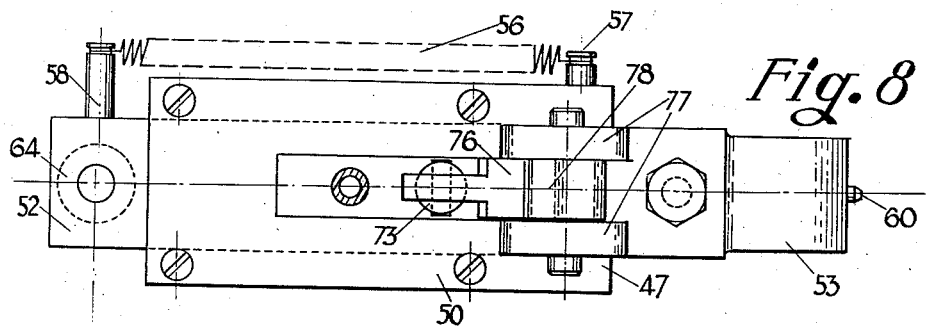
Fig. 8
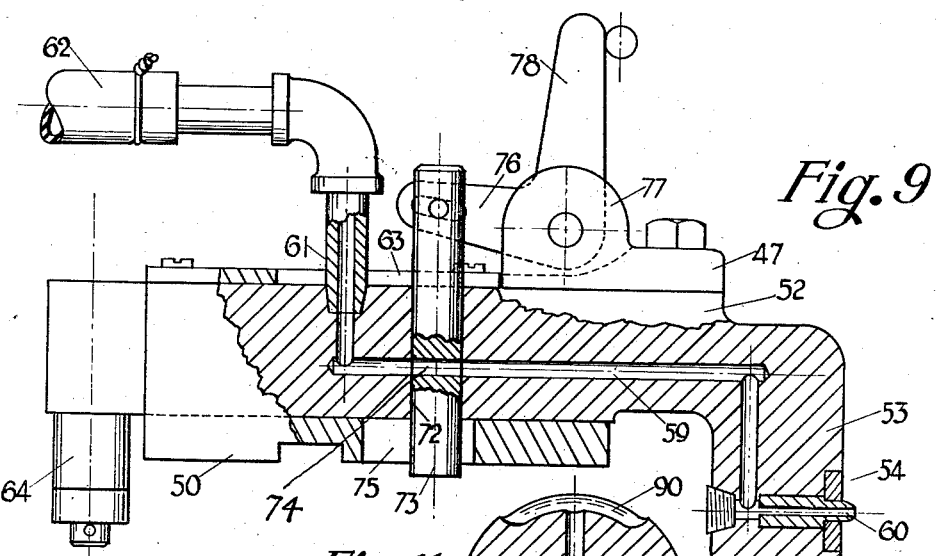
Fig. 9
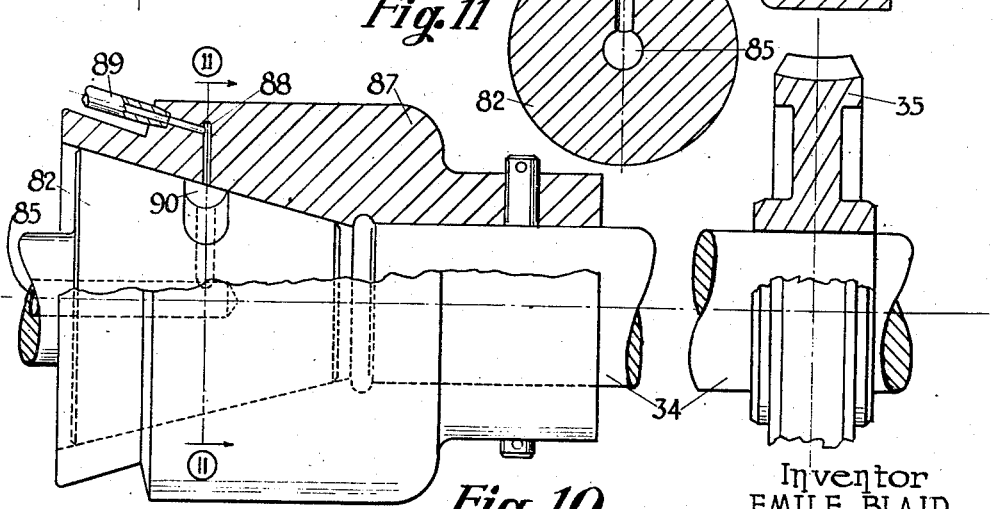
Fig. 11
Fig. 10
Inventor
EMILE BLAIR
Per
Attorney Patented Sept. 25, 1945

2,385,491

UNITED STATES PATENT OFFICE 2,385,491

TUBE TESTING APPARATUS

Emile Blair, Dayton, Ohio, assignor to Standard Aircraft Products, Inc., Dayton, Ohio, a corporation of Delaware Application March 27, 1943, Serial No. 480,837

25 Claims. (Cl. 73—41)

This invention relates to an apparatus for testing tubular articles and is designed more particularly for testing thin small diameter tubes of the type used in oil coolers and for like purposes. Such tubes are commonly extruded from blanks by impact pressure and it is important that each tube be tested for leakage.

One object of the invention is to provide an apparatus which will operate on a plurality of tubes successively and rapidly to detect leaks therein and will separate defective tubes from the good tubes.

A further object of the invention is to provide an apparatus for testing tubes by subjecting each tube to fluid pressure to visually disclose a leak therein and having means under the control of an observer for separating leaky tubes from the good tubes.

A further object of the invention is to provide an apparatus which will test the tubes by submerging the same in water and subjecting each tube to air pressure while so submerged.

A further object of the invention is to provide an apparatus in which the application of air under pressure to each tube will be limited substantially to the interval during which the tube is submerged.

A further object of the invention is to provide an apparatus in which the flow of air under pressure through each tube supporting device is interrupted when that supporting device is not in engagement with a tube.

A further object of the invention is to provide an apparatus in which the flow of air under pressure through the tube supporting device may be quickly interrupted when the test shows a tube to be defective.

A further object of the invention is to provide such an apparatus which will be largely automatic in its operation and will not require the attendance of a skilled operator.

Other objects of the invention may appear as the apparatus is described in detail.

Figure 1:
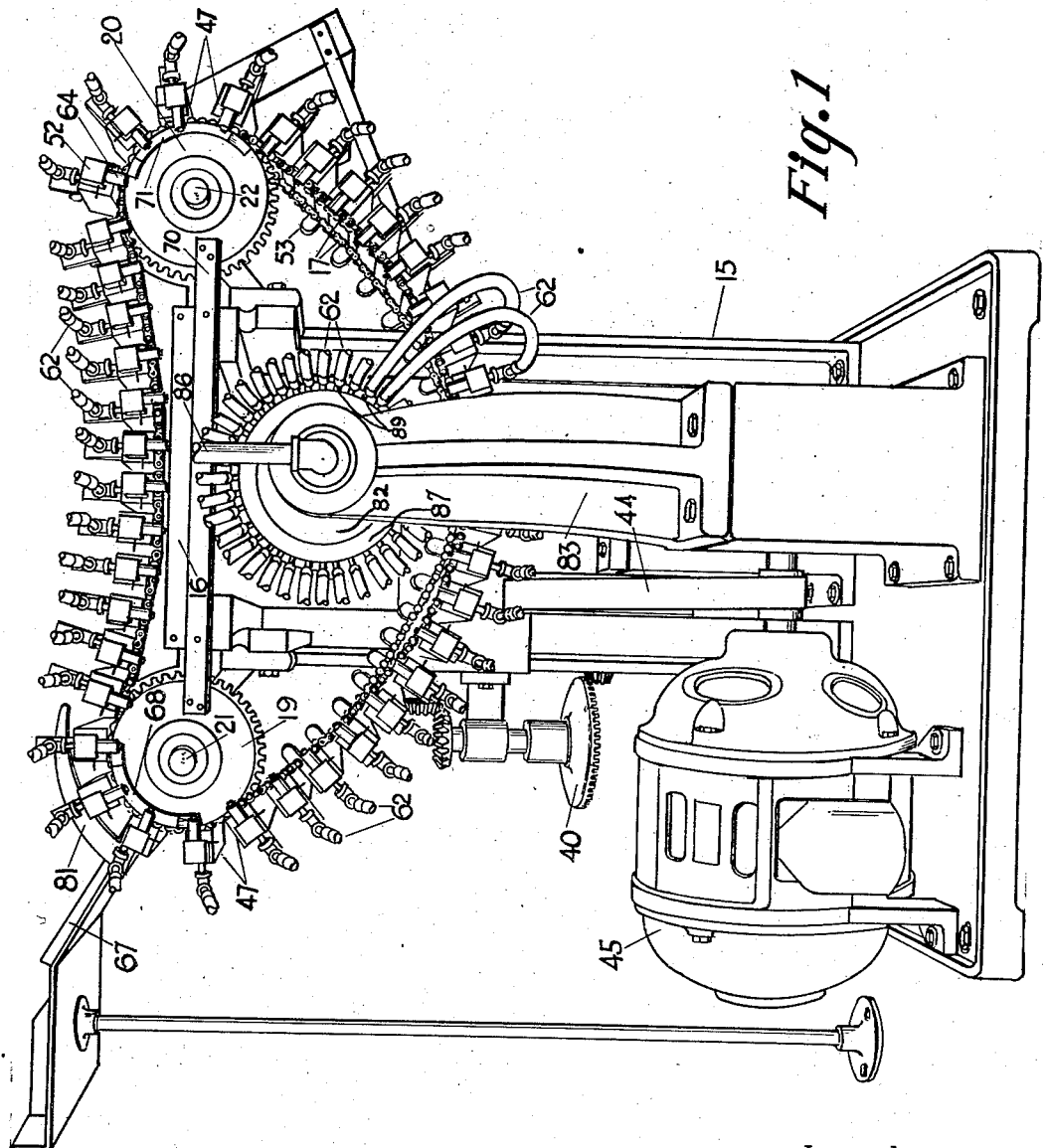
Figure 2:
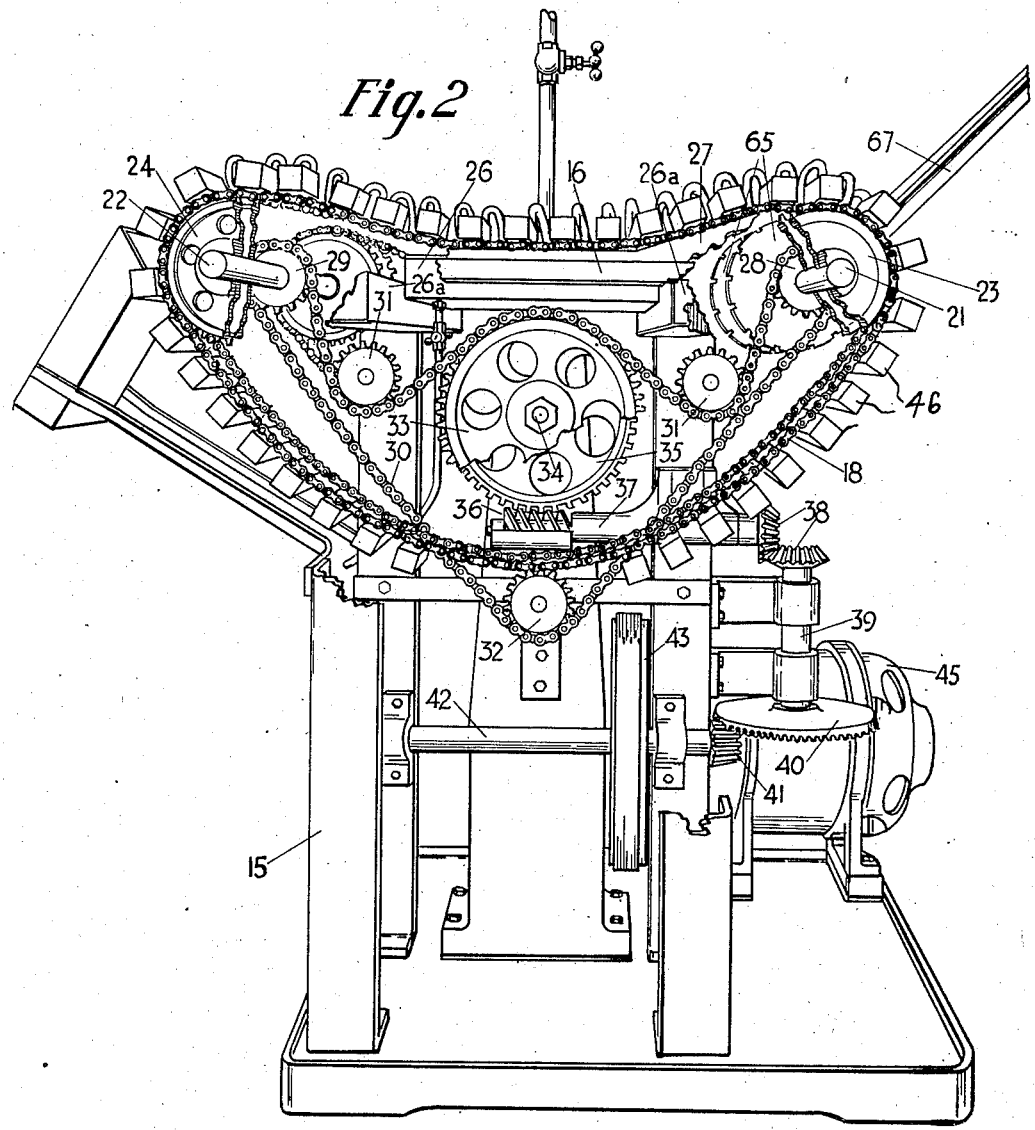
Figure 3:
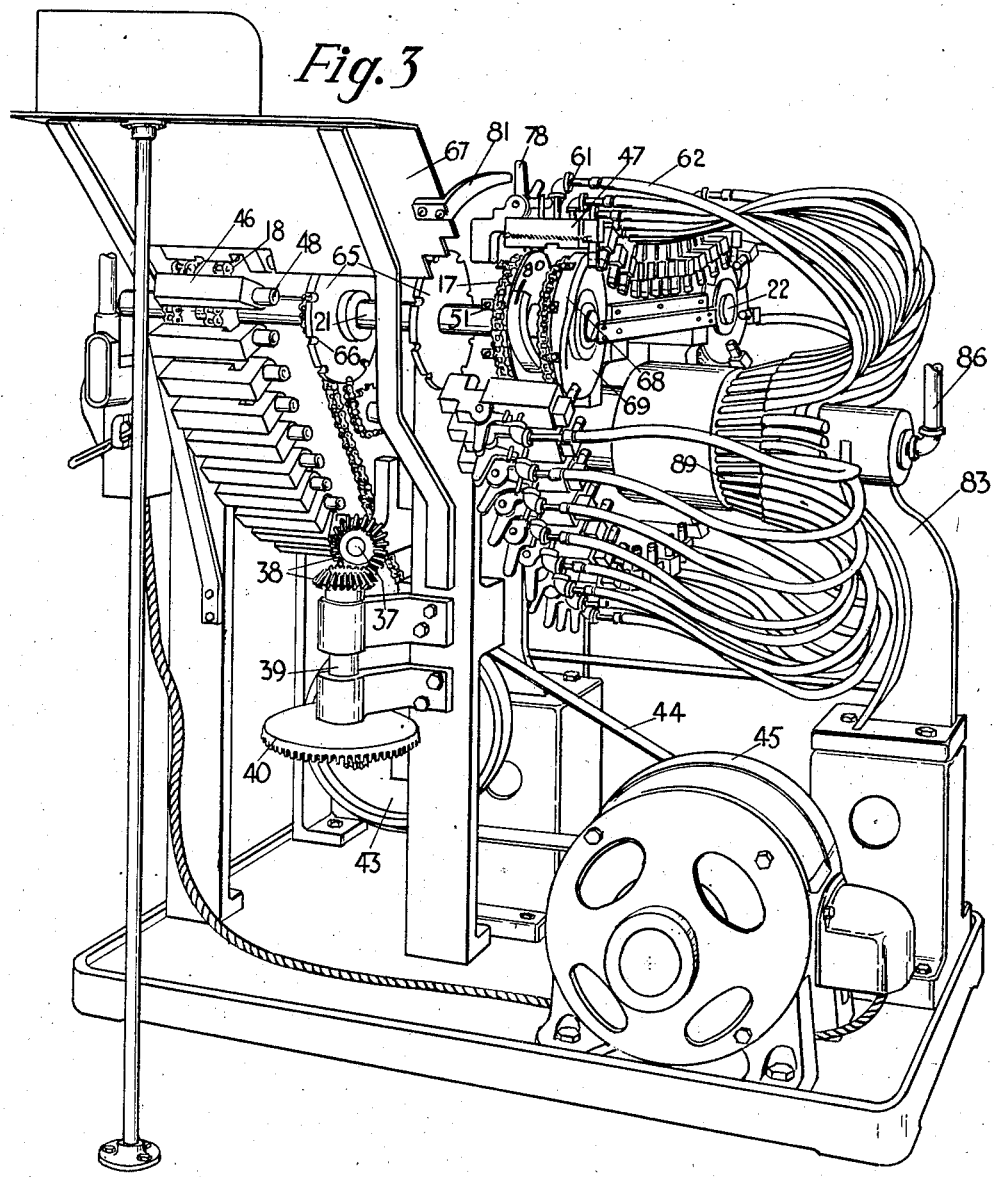
Figure 4:
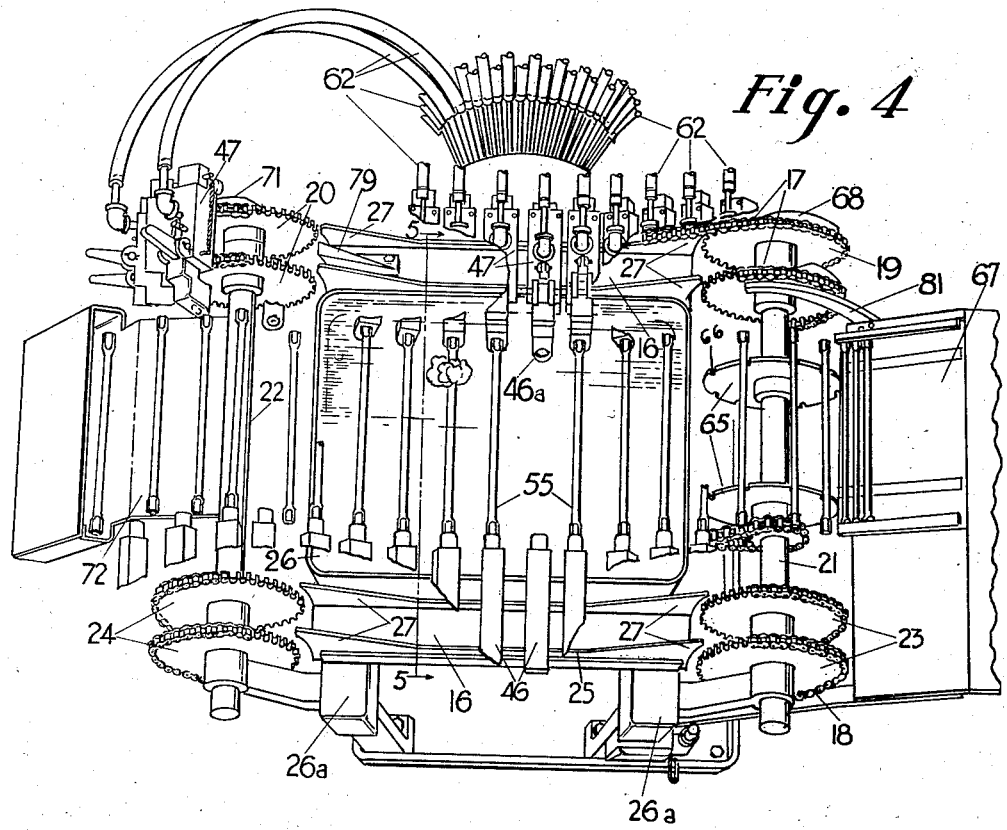
Figure 5:
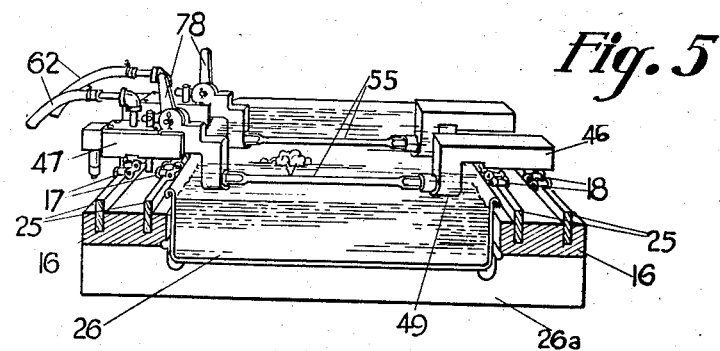
Figure 6:
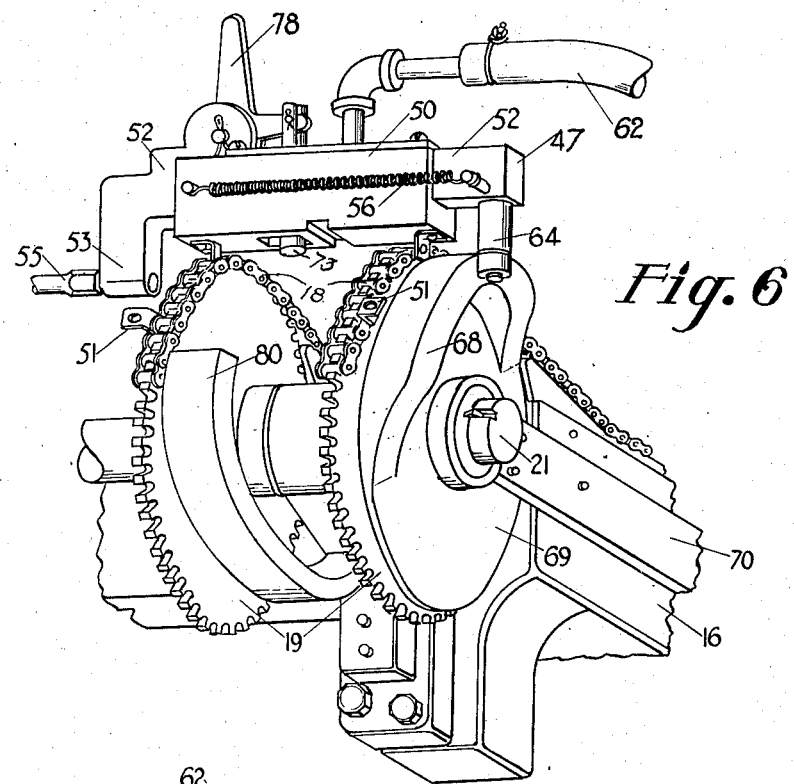
Figure 7:
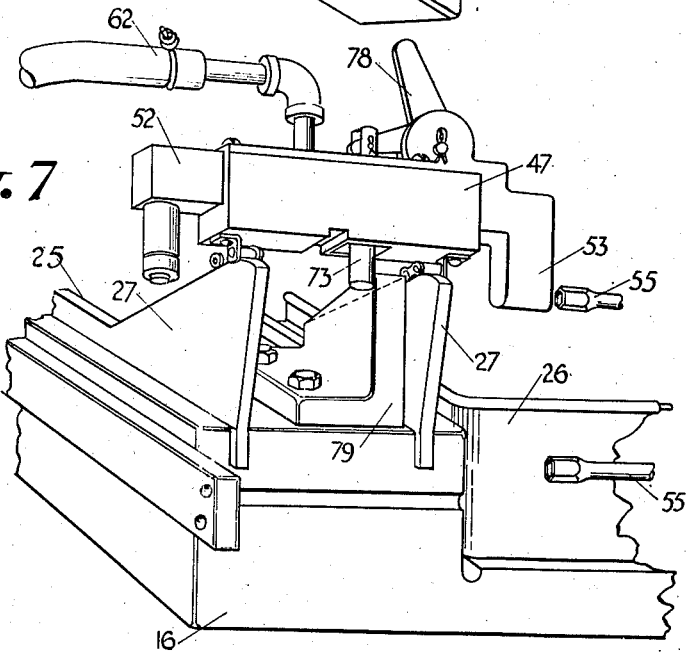

In the accompanying drawings Fig. 1 is a perspective view of one side of an apparatus embodying the invention, partly broken away; Fig. 2 is a similar view of the other side of the apparatus, partly broken away; Fig. 3 is a perspective view of one end of the apparatus, partly broken away; Fig. 4 is a top view of the apparatus, also in perspective and partly broken away; Fig. 5 is a transverse sectional view taken on the line 5—5 of Fig. 4; Fig. 6 is a detail view of one of the tube supporting members and the controlling means therefor; Fig. 7 is a detail view of the device for releasing a defective tube; Fig. 8 is a plan view of one of the tube supporting members; Fig. 9 is an elevational view, partly in section, taken lengthwise of the tube supporting member of Fig. 8; Fig. 10 is an elevational view, partly in section, of the master air valve; and Fig. 11 is a sectional view taken on the line 11—11 of Fig. 10.

In these drawings I have illustrated one embodiment of the invention and have shown the same as designed primarily for testing thin wall small diameter tubes of the type used in oil coolers but it is to be understood that the apparatus may take various forms and may be used for testing tubular structures of various kinds. The term "tube" as herein used is intended to include any tubular structure capable of being tested on such an apparatus.

In its preferred form the apparatus comprises a carrier having means for individually supporting thereon a plurality of tubes, spaced laterally one from the other lengthwise of the carrier, and for moving said tubes successively to testing position, the test being preferably effected by subjecting the tube to air pressure under such conditions that a leak may be visually detected. Preferably the arrangement is such that each tube during a portion of its travel will be submerged in water, or other suitable liquid, in a receptacle supported adjacent to the carrier. Air, or other gaseous fluid, under pressure, is introduced into each tube and the pressure maintained while the tube is submerged so that the escape of air from a leaky tube will cause bubbles to rise to the surface of the water and thus visually disclose to the operator the fact that the tube is defective. Means are provided for automatically releasing the good tubes, that is, the tubes that do not leak, from their supports and discharging the same at a normal point of discharge beyond the water receptacle and other means are provided whereby the operator may cause a leaky tube to be released and discharged at a different point of discharge. The introduction of air under pressure into the tubes is limited substantially to the period during which the tubes are submerged. The support for each tube is provided with an individual air duct and means may be provided for interrupting the flow of air through that duct if no tube is picked up by the support or if the tube picked up thereby leaks. The tubes are fed continuously to the carrier and the apparatus operates automatically excepting the manipulation by the operator to cause a defective tube to be released. As herein used the term "water" includes any liquid suitable for the purpose and the term "air" includes any gaseous fluid suitable for introduction, under pressure, into the tubes.

In the particular arrangement herein illustrated the apparatus comprises a supporting structure or main frame 15 having laterally spaced parallel parts 16 extending lengthwise thereof. Mounted on this frame is an endless carrier which preferably comprises two laterally spaced endless conveyors, 17 and 18, movable in parallel paths. These conveyors carry the tube supporting devices, to be hereafter described, and, in the present arrangement it is desirable that each conveyor shall consist of two chains to prevent the tilting of the supporting devices. When tilting is otherwise prevented a single chain will suffice for each conveyor. The chains of the conveyor 17 extend about and are driven by sprocket wheels 19 and 20 secured respectively to shafts 21 and 22 rotatably mounted upon the main frame near the respective ends of the latter. The chains of the conveyor 18 extend about and are driven by sprocket wheels 23 and 24 likewise secured to the shafts 21 and 22, so that the two conveyors are driven at the same speed. The upper stretches of the conveyors, or the intermediate portions thereof, are supported on the side members 16 of the main frame and the chains of each conveyor preferably engage and are guided by longitudinal tracks 25 carried by the side members 16. A water receptacle 26 is supported on the main frame between the side members 16 of the frame and below the level of the upper stretches of the conveyor by cross bars 26a secured to the frame members, and the end portions 27 of the tracks 25 slope from points adjacent the respective sprocket wheels toward the intermediate parts thereof to guide the upper stretch of the conveyor downwardly so as to submerge the tubes in the water in the receptacle, as will herein appear.

The conveyors may be driven in any suitable manner and in the arrangement herein illustrated the shafts 21 and 22 are provided respectively with sprocket wheels 28 and 29 and a driving chain 30 extends about both sprocket wheels 28 and 29 and about guide sprockets 31 and 32, the intermediate portion of the upper stretch of the chain extending about and having driving engagement with the upper portion of a sprocket wheel 33 rigidly secured to a shaft 34. Rigidly connected with the shaft 34 is a worm gear 35 which meshes with a worm 36 on a horizontal shaft 37 which is connected by beveled pinions 38 with a vertical shaft 39 having at its lower end a beveled gear 40 which meshes with a pinion 41 on a shaft 42, and a pulley 43 on the shaft 42 is connected by a belt 44 with an electric motor 45. The train of gearing between the motor and the shafts 21 and 22 serves to reduce the speed and the ratio of reduction between the sprocket wheel 33 and the sprocket wheels 28 and 29 is such that the conveyors 17 and 18 will make one complete revolution for each rotation of the sprocket wheel 33.

The carrier is provided with devices for separately supporting thereon a plurality of tubes, spaced apart lengthwise of the carrier, and for sealing the ends of the tubes, except for an air inlet for each tube. The supporting devices may take various forms but preferably each such device comprises two members 46 and 47 secured respectively to the conveyors 18 and 17, at least one member having a part movable transversely to the line of movement of the carrier to enable the tube to be inserted between and supportingly engaged by the respective supporting members. There may be any suitable number of tube supporting devices and they may be spaced apart such distances as are found convenient in manufacture and operation. Each tube supporting member 46 consists merely of a block of metal secured to the chains of the conveyor 18 and having its inner end extending beyond the adjacent wall of the water receptacle and provided with a sealing medium, preferably of rubber or of like material, with which the end of a tube engages, this sealing member being in the present instance carried by an offset part 49 of the member 46 so arranged that when the member 46 is on the upper stretch of the conveyor the part will extend downwardly so that the sealing member and therefore the tube engaged thereby will be submerged in the water in the receptacle 26. The engagement of the conveyor chains with the tracks 25 holds the member 46 against movement transversely to the tracks by the pressure of a tube against the same.

Each supporting member 47 comprises a part which is fixed with relation to the conveyor 17 and a part which is movable transversely to that conveyor and therefore is movable toward and from the corresponding supporting member 46. As shown more particularly in Figs. 8 and 9 the tube supporting member 47 comprises a housing 50 secured to the conveyor chains 17, as by clips 51 (see Fig. 6). This housing constitutes a guideway in which an elongate element 52 is slidably mounted. At its inner end this movable element has an offset part 53 adapted to extend downwardly when the supporting member is on the upper stretch of the conveyor, this offset part having a sealing member 54 adapted to engage the adjacent end of a tube 55, the other end of which is engaged by the sealing member 48 of the supporting member 46. The movable element 52 is biased to tube engaging position, preferably by a spring 56 connected at one end with a stud 57 on the housing 50 and at the other end with a stud 58 on the outer end of the slidable element. The slidable element 52 is provided with an air duct 59 one end of which opens through a nipple 60 arranged to extend into a tube which is in engagement with a sealing member 54. The other end of the duct opens through a fitting 61 mounted in the slidable element 52 and connected by a flexible tube 62 with a source of supply of air under pressure, the fitting extending through a slot 63 in the top wall of the housing so as to permit the movement of the slidable element. At its outer end the slidable element is provided with a device 64 whereby it may be retracted against the action of the spring 56.

Arranged in advance of the water receptacle 26 is a positioning device to support tubes successively in a position to be engaged by the tube supporting device. This positioning device preferably consists of two disks 65 rigidly secured to the shaft 21, spaced one from the other and provided with peripheral notches 66, the corresponding notches of the two disks being in alinement and adapted to receive tubes from an inclined chute 67 and to advance the tubes so received at the same speed as the carrier moves. As each supporting member moves with the lower stretch of the conveyor the movable element thereof is held in its innermost position by the action of the spring 56 and when in this position the tube engaging part 53 thereof projects inwardly beyond tube engaging position. (Note the position of supporting member 46a in Fig. 4.) It is therefore necessary to retract the movable element as it moves about the sprocket wheels 19 to enable it to move into line with the tube on the tube positioning device 65. This is preferably accomplished by means of a fixed cam 68 (Fig. 6) supported on the projecting end of shaft 21 and, in the present instance, carried by and forming a part of a disk 69 which is held against rotation with the shaft by a bar 70 rigidly secured to the disk and to the side member 16 of the main frame. The cam 68 is inclined at both ends but has an intermediate portion of uniform width. As a supporting member 47 moves about the sprocket wheels 19 toward the tube positioning device the retracting member 64 thereof engages the cam 68 and is moved outwardly thereby and is held in that position until the tube engaging part 53 of the element 52 has moved into line with the end of a tube 55 on the tube positioning device. The tube positioning device moves the tube at the same speed that the supporting device is moving and maintains the same in a position to be picked up by the supporting device as the retracting device moves down the other inclined surface of the cam and thus releases the movable element 52 for movement by the spring 56 into engagement with the tube. The other end of the tube is in alinement with the tube engaging part 49 of the corresponding supporting member 46 and the pressure of the slidable element 52 on the tube causes the same to be gripped firmly between the two supporting members and the ends of the tube tightly sealed by engagement with the sealing members. The tube thus supported is carried forward and down the inclined portions 27 of the tracks for the conveyors to submerge the tube in the water in the receptacle 26. Just before the tube is submerged air under pressure is introduced into the tube through the duct 59 and the pressure is maintained as the tube travels through the water. If there is no leak in the tube the pressure will be relieved as it moves beyond the water receptacle and the retracting device 64 of the tube supporting member will engage a fixed cam 71 (Fig. 1), supported on the end of shaft 22 and held against movement by the bar 70, and will be retracted thereby to move the tube engaging part of the slidable element out of engagement with the tube and thereby release the latter for discharge. Ordinarily the point at which the tube is released is so controlled that when released the tube will drop on a chute 72 leading to a suitable receptacle.

If a tube is defective, that is, if it leaks, the air escaping from the same as it moves through the water will cause bubbles to rise to the surface of the water thus indicating to the operator that that particular tube is defective and means are provided whereby the supply of air to the tube may be interrupted and the tube released at a point of discharge different from the normal point of discharge. For this purpose the slidable element 52 of each tube supporting member 47 is provided with a vertical bore 72 which intersects the air duct 59 and in which is slidably mounted a supplemental retracting device 73 which also constitutes a cutoff valve, and to that end is shown in the form of a cylindrical rod having a port 74 which registers with the duct 59 when the retracting device 73 is in its normal or inoperative position, as shown in Fig. 9. The lower end of the retracting device 73 extends through a slot 75 in the bottom of the housing 50 and the upper end thereof extends through the slot 63 in the top of the housing and is connected with one arm 76 of a bell crank which is pivotally mounted between pivot lugs 77 on the housing 50 so that the other arm thereof extends upwardly and constitutes an actuating lever, as shown at 78, the movement of which will raise or lower the retracting device 73. There is sufficient frictional contact between the hub portion of the bell crank and the pivot lugs 77 to retain the retracting device in the position to which it is moved until force is applied thereto. The operator stands at that side of the apparatus adjacent the conveyor 18 and supporting members 46 and thus faces the water receptacle. When bubbles indicate that a particular tube is leaking the operator pushes back the actuating arm 78 of the bell crank on the member 47 which is in engagement with that tube to the position shown in Figs. 5 and 7 and thereby moves the port 74 out of line with the duct 59 and cuts off the supply of air to the tube and also causes the retracting device to project below the housing 50 such a distance that it will engage a fixed cam 79 mounted on the frame member 16 between the inclined portions 27 of the tracks 25, so that as the supporting member approaches the sprocket wheels 20 at the discharge end of the apparatus the cam will act on the retracting device to retract the slidable element 52 and thus release the tube. The cam 79 is preferably so arranged that the tube will be released at a point between the water receptacle and the chute 72. When the supporting member has been moved beyond the cam 79 the retracting device 73 remains in its operative or projected position with the air duct closed and, therefore, it must be moved to its inoperative position as the supporting member approaches tube pick-up position. For this purpose a cam 80 is arranged between the sprocket wheels 19 and is supported on the frame member 16 in such a position that as the tube supporting member moves about the sprocket wheels the projecting end of the supplemental retracting device 73 will ride over the cam and be forced upwardly thereby to open the air duct.

If there should be no tube in pick-up position as the main retracting device 64 of a tube supporting member moves off of the cam 68 the air entering the air duct in that member would escape to the atmosphere and this would not only cause a waste of air and pressure but as the supporting member passed through the water it would cause a violent splashing of the water. It is therefore desirable that some means be provided to automatically cut off the air supply in any supporting member which moves past pickup position without picking up a tube. As has been pointed out when the slidable element does not engage a tube it is moved by its spring to a position beyond tube engaging position, as shown at 46a in Fig. 4, and this movement may be utilized to actuate the retracting device and valve, 73, to cut off the air. For this purpose an arm or bar 81 is rigidly secured to a fixed part of the apparatus, preferably in the rear of the tube positioning device, and extends along the line of movement of the actuating levers for the retracting devices 73. The arm is so positioned with relation to the normal path of the lever 78 that when the movable element is in engagement with a tube the lever will not engage the arm but if the movable element is moved beyond its tube engaging position the lever 78 will engage the arm 81 and be actuated thereby to depress the retracting device 73 and thus close the air duct 59.

The air ducts of the several tube supporting members may be connected with a source of air under pressure in any suitable manner but it is desirable that the supply of air to each supporting member shall be so controlled that the air will not flow through the air duct of that member until after the slidable element thereof is moved to tube engaging position and will be interrupted when the supporting member has moved beyond testing position, that is, moved beyond the water receptacle. In the present instance the flow of air to the tube supporting member is controlled by a master valve which, as here shown, comprises a frusto conical valve member 82 mounted on a fixed support, as shown at 83, and having a duct 85 connected with a pipe 86 leading to a compressor or to a storage reservoir or the like. This fixed valve member extends into and has sealing engagement with a rotatable frusto conical valve housing 87 provided with a circumferential series of ducts 88 each of which leads to a nipple 89 with which one of the flexible tubes 62 is connected. The fixed valve member 82 is provided with a circumferential groove or port 90 which is in open communication with the duct 85 leading to the air source. The valve housing rotates about the fixed valve member and the ducts 88 move successively into communication with the port 90. Preferably the port 90 is of such length and so arranged that air will be admitted to each tube supporting member between the time it has picked up a tube and the time at which it reaches its submerged or testing position and the flow of air thereto will be interrupted as it moves beyond testing position. It will be understood that a considerable number of tube supporting members will be connected simultaneously with the source of air supply and that as the tubes pass through and beyond the water receptacle the corresponding ducts 88 pass out of communication with the port 90. The valve housing 87 must of course make one complete rotation for each complete revolution of the tube carrier and, in the present instance, the housing is rigidly secured to the shaft 34 which carries the worm gear 35 and sprocket wheel 33. As has been heretofore pointed out the shaft 34 makes one complete rotation for each complete revolution of the tube carrier.

It will be apparent that in the operation of the apparatus tubes are fed successively to the tube positioning device which advances each tube to a position in which it may be engaged by the tube engaging members of one supporting device and carried forward by the supporting device to testing position. As each supporting member approaches the pick-up position the air duct therethrough is open and before the tube reaches testing position the corresponding duct 88 of the master valve moves into communication with the duct 85 and establishes connection between the air duct in the supporting member and the source of air under pressure. This pressure is maintained in the tube as it moves through the water and is interrupted shortly after the tube passes out of the water, the corresponding duct 88 at that time moving out of communication with the duct 85 in the master valve, and the continued movement of the tube by the carrier causes the movable element of the supporting member to be retracted to thus release the tube and permit it to drop from the carrier. If the supporting member moves past the pick-up position without picking up a tube the air duct is closed before it is connected with the source of air supply. If, as the tube moves through the water, bubbles show that it leaks the operator moves the actuating lever on the supporting member to close the air duct in the latter and to move the supplemental retracting device to operative position so that it will engage the fixed cam and retract the movable element and release the tube at a point in advance of normal discharge position. The operation is continuous and is wholly automatic with the single exception that the operator must note the presence of a leaky tube and actuate the supplemental releasing mechanism.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In an apparatus for testing tubes, a receptacle for water, a carrier having separate devices for supporting thereon a plurality of tubes in laterally spaced relation one to the other and arranged to submerge said tubes successively in the water in said receptacle, each supporting device including alined members spaced apart to engage the respective ends of the tube and having means to seal said ends, one of said members comprising a part fixed with relation to said carrier and a part mounted on the first mentioned part for movement transverse to the line of travel of said carrier, spring means acting on said movable part to cause the same to engage one end of a tube and move the other end of said tube into engagement with the other member of said supporting device, said movable part having an air passage extending through the sealing means thereof and means for connecting said air passage with a source of air under pressure, means in advance of said receptacle for moving tubes successively to a position to be engaged by the respective supporting devices, means for retaining the movable part of each supporting device in a retracted position as said supporting device moves into alinement with a tube on said tube positioning means and for releasing said movable part for movement by said spring means when said supporting device is in such alinement, means for retracting the movable part of each supporting device to release the tubes at a point beyond said receptacle, and means including a manually controlled device for retracting said movable part to release a selected tube at a different point.

2. In an apparatus for testing tubes, a receptacle for water, a carrier having separate devices for supporting thereon a plurality of tubes in laterally spaced relation one to the other and arranged to submerge said tubes successively in the water in said receptacle, each supporting device including alined members spaced apart to engage the respective ends of a tube and having means to seal said ends, one of said members comprising a part fixed with relation to said carrier, a part mounted on the first mentioned part for movement transverse to the line of travel of said carrier, and spring means acting on said movable part to cause the same to engage one end of a tube and move the other end of said tube into engagement with the other member of said supporting device, said movable part having an air passage extending through the sealing means thereof, means for connecting said air passage with a source of air under pressure, means in advance of said receptacle for moving tubes successively to a position to be engaged by the respective supporting devices, a fixed cam for retracting the movable part of each supporting member as the latter approaches a tube on said positioning means and for releasing the same for movement by said spring means when it is in line with said tube, a fixed cam for retracting the movable part of said supporting member to release said tube at a point beyond said receptacle, a third fixed cam in advance of the last mentioned cam, a normally inoperative member supported on said movable part, and means for moving the last mentioned member to a position to engage said third cam and retract said movable part.

3. In an apparatus for testing tubes, a receptacle for water, a carrier having means for separately supporting a plurality of tubes in laterally spaced relation and arranged to move said tubes through the water in said receptacle, each supporting means comprising spaced members adapted to engage and seal the respective ends of a tube, one of said members having a movable part to engage said tube and press the same against the other member, means controlled by the movement of said carrier to move said movable part to tube engaging position, other means controlled by the movement of said carrier to retract said movable part and release said tubes at a normal point of discharge, one of said parts having an air duct leading to the interior of said tube, a master valve connected with the air duct of each tube supporting means and having a part moving in timed relation to the movement of said carrier to connect the duct of each supporting means with a source of air under pressure as said supporting means enters said receptacle and for interrupting said connection as said supporting means moves out of said receptacle, and means independent of said master valve for interrupting the flow of air to a defective tube and for retracting the movable part of the supporting means for said defective tube to release the latter at a point of discharge different from said normal point of discharge.

4. In an apparatus for testing tubes, an endless carrier, a plurality of tube supporting and sealing devices carried by said carrier, each including a part movable into and out of supporting engagement with the tube and having an air duct leading to the interior of a tube engaged thereby, means for supporting a tube in a position to be engaged by said movable part, means controlled by the movement of said carrier for moving said movable part into engagement with a tube on said supporting means and for retracting said movable part to release said tube at a point of normal discharge, means operating in timed relation to said carrier to connect said air duct with a source of air under pressure after said movable part has engaged the tube and to disconnect said air duct from said air source before said movable part is retracted, and other means for retracting said movable part at a different point of discharge including a fixed element, a normally inoperative element, and a manually operable device for interrupting the connection between said air duct and said source of air and for moving said inoperative element into operative relation to said fixed element.

5. In an apparatus for testing tubes, an endless carrier, a plurality of tube supporting and sealing devices carried by said carrier, each including a part movable into and out of supporting engagement with a tube and having an air duct leading to the interior of a tube engaged thereby, means for supporting a tube in a position to be engaged by said movable part, means controlled by the movement of said carrier for moving said movable part into engagement with a tube on said supporting means and for retracting said movable part to release said tube at a point of normal discharge, means operating in timed relation to said carrier to connect said air duct with a source of air under pressure after said movable part has engaged the tube and to disconnect said air duct from said air source before said movable part is retracted, other means for retracting said movable part at a different point of discharge including a fixed element, a normally inoperative element, a manually operable device for interrupting the connection between said air duct and said source of air and for moving said inoperative element into operative relation to said fixed element, and means controlled by the movement of said carrier to actuate said manually operable device to interrupt said connection when said operable part does not have supporting engagement with a tube after it has been moved to tube engaging position.

6. In an apparatus for testing tubes, a carrier to move tubes successively to testing position, a plurality of tube supporting devices carried by said carrier and each having means for sealing the ends of a tube supported thereby, an air duct to communicate with the interior of a tube supported thereby, and a part movable with relation to said carrier, means controlled by the movement of said carrier to move the movable part of each supporting device to tube engaging position as it approaches testing position and to move the same out of tube engaging position as it moves beyond testing position, means operating in timed relation to said carrier to connect the air duct of each supporting device with a source of air under pressure after said movable part has moved to tube engaging position and to interrupt said connection after said supporting device has moved beyond testing position, a normally open valve to control the flow of air through each duct, and means controlled by the movement of said carrier for actuating said valve to close said duct when said movable part does not have supporting engagement with a tube after having been moved to tube engaging position.

7. In a tube testing apparatus, a carrier to move tubes successively to testing position, a plurality of tube supporting devices carried by said carrier and each comprising opposed parts to engage and seal the respective ends of the tube, one of said parts being movable transversely to the line of movement of said carrier, being biased toward the other part and having an air duct to communicate with the interior of a tube engaged thereby, means for positioning tubes for engagement by said tube supporting devices in advance of said testing position, means controlled by the movement of said carrier for retracting said movable part of each supporting device in advance of said positioning means to permit it to move into line with a tube on said positioning means and to then release the same when it is in line with said tube for movement into operative engagement with said tube, means for retracting said movable part to release said tube at a point of discharge beyond said testing position, means for connecting said air duct with a source of air under pressure after said movable part has engaged said tube and for interrupting said connection when said tube has been moved beyond said testing position, and normally inoperative means for retracting said movable part to release said tube at a different point of discharge including a manually actuated device to render said means operative and to interrupt the connection between said air duct and said source of air.

8. In an apparatus for testing tubes, a frame, a carrier movably supported on said frame, a tube supporting device including a member carried by said carrier and having means to seal one end of the tube, a second member carried by said carrier and comprising a part movable transversely to the line of travel of said carrier and having means to support and seal the other end of said tube, means including a retracting member carried by said movable part and devices mounted on said frame to engage said retracting member, to move said movable part into engagement with a tube, to maintain said engagement while said carrier advances said tube to and beyond testing position and to then retract said movable part to release said tube at a normal point of discharge, and additional means for retracting said movable part including a device mounted on said frame, a normally inoperative retracting member mounted on said movable part for movement into and out of operative relation to the last mentioned device, and manually operable means to move said member to a position in which it will engage said last mentioned device as said carrier advances and release said tube at a point of discharge in advance of said normal point of discharge.

9. In an apparatus for testing tubes, a frame, a carrier movably supported on said frame, a tube supporting device including a member carried by said carrier and having means to support and seal one end of the tube, a second member carried by said carrier and comprising a part movable transversely to the line of travel of said carrier and having means to support the other end of said tube, spring means tending to move said movable part inwardly beyond its tube engaging position, a fixed cam mounted on said frame adjacent one end of the latter and arranged to move said movable part outwardly to permit it to be moved by said carrier into line with a tube and to then move into engagement with said tube, a second fixed cam mounted on said frame adjacent the other end thereof to move said movable part outwardly and release said tube, a retracting member movably mounted on said movable part and retained normally in an inoperative position, manually controlled means for moving said retracting member to an operative position, and a third cam mounted on said frame in a position to be engaged by said retracting member when the latter is in said operative position and to move said movable member outwardly.

10. In an apparatus for testing tubes, a frame, a carrier movably supported on said frame, a tube supporting device including a member carried by said carrier and having means to support and seal one end of the tube, a second member carried by said carrier and comprising a part movable transversely to the line of travel of said carrier and having means to support the other end of said tube, spring means to move said movable part inwardly beyond its tube engaging position, said movable part having an air passage arranged to communicate with said tube, means for connecting said air passage with a source of air under pressure, means adjacent one end of said frame to retract said movable part to permit it to move into line with a tube and to then release the same for movement into engagement with said tube, means adjacent to the other end of said frame to retract said movable part and release said tube at a point of normal discharge, means for retracting said movable part to release said tube at a different point of discharge including a normally inoperative retracting member carried by said movable part, an actuating device to move said retracting member to an operative position, and means controlled by said actuating device to interrupt the flow of air to said tube when said retracting member is moved to said operative position.

11. In an apparatus for testing tubes, a frame, a carrier movably supported on said frame, a tube supporting device including a member carried by said carrier and having means to support and seal one end of the tube, a second member carried by said carrier and comprising a part movable transversely to the line of travel of said carrier and having means to support the other end of said tube, spring means to move said movable part inwardly beyond its tube engaging position, said movable part having an air passage arranged to communicate with said tube, means for connecting said air passage with a source of air under pressure, means adjacent one end of said frame to retract said movable part to permit it to move into line with a tube and to then release the same for movement into engagement with said tube, means adjacent to the other end of said frame to retract said movable part and release said tube at a point of normal discharge, means for retracting said movable part to release said tube at a different point of discharge including a normally inoperative retracting member carried by said movable part, intersecting said air passage and having a port normally in line with said passage, and manually operated means to move said retracting member to an operative position and to close said passage.

12. In an apparatus for testing tubes, a frame, a carrier movably supported on said frame, a tube supporting device including a member carried by said carrier and having means to support and seal one end of the tube, a second member carried by said carrier and comprising a part movable transversely to the line of travel of said carrier and having means to support the other end of said tube, spring means to move said movable part inwardly beyond its tube engaging position, said movable part having an air passage arranged to communicate with said tube, means for connecting said air pasage with a source of air under pressure, means adjacent one end of said frame to retract said movable part to permit it to move into line with a tube and to then release the same for movement into engagement with said tube, means adjacent to the other end of said frame to retract said movable part and release said tube at a point of normal discharge, means for retracting said movable part to release said tube at a different point of discharge including a normally inoperative retracting member carried by said movable part, an actuating device to move said retracting member to an operative position, means controlled by said actuating device to interrupt the flow of air to said tube when said retracting member is moved to said operative position, and means for restoring said retracting member to its inoperative position and renewing the flow of air to said tube prior to the movement of said movable part into engagement with another tube.

13. In an apparatus for testing tubes, a frame, a carrier supported on said frame for moving tubes to and from testing position, a tube supporting device including a member carried by said carrier and having means to support and seal one end of a tube and a second member carried by said carrier and comprising a part movable transversely to the line of travel of said carrier and having means to support and seal the other end of said tube, one of said members having an air passage leading to the tube supported thereby, spring means to move said movable part inwardly beyond its tube engaging position, positioning means to support a tube in a position to be engaged by said tube supporting device in advance of said testing position, means for retracting said movable part to permit it to move into line with a tube on said positioning means and to then release the same for movement into engagement with said tube, means beyond said testing position to retract said movable part and release said tube at a normal point of discharge, means for connecting said air passage with a source of air under pressure as said tube approaches testing position and for interrupting said connection as said tube moves beyond said testing position, means for retracting said movable part to release said tube at a different point of discharge, and means for interrupting the flow of air through said passage when said supporting device passes the pickup point without engaging a tube.

14. In an apparatus for testing tubes, a frame, a carrier supported on said frame for moving tubes to and from testing position, a tube supporting device including a member carried by said carrier and having means to support and seal one end of a tube and a second member carried by said carrier and comprising a part movable transversely to the line of travel of said carrier and having means to support and seal the other end of said tube, one of said members having an air passage leading to the tube supported thereby, spring means to move said movable part inwardly beyond its tube engaging position, positioning means to support a tube in a position to be engaged by said tube supporting device in advance of said testing position, means for retracting said movable part to permit it to move into line with a tube on said positioning means and to then release the same for movement into engagement with said tube, means beyond said testing position to retract said movable part and release said tube at a normal point of discharge, means for connecting said air passage with a source of air under pressure as said tube approaches testing position and for interrupting said connection as said tube moves beyond said testing position, means for retracting said movable part to release said tube at a different point of discharge including a normally inoperative retracting member carried by said movable part, a valve to control the flow of air through said passage, and means to render said inoperative retracting member operative and to actuate said valve to close said air passage when said supporting member passes the pickup point without engaging a tube.

15. In an apparatus for testing tubes comprising a frame, laterally spaced tracks extending lengthwise of said frame, endless conveyors having their upper stretches supported on and movable lengthwise of the respective tracks, a water receptacle supported between said tracks below the level thereof, said tracks having depressed portions adjacent said receptacle, tube supporting devices each including two members carried by the respective conveyors, each supporting member having an offset tube engaging part arranged to extend into said receptacle as said conveyor moves over said tracks, the offset part of at least one of said supporting members being movable toward and from the offset part of the other member, means for actuating said movable part to cause the ends of the tube to be engaged by the respective parts carried thereby through said receptacle and then released from said parts, and means for subjecting said tube to internal air pressure as it moves through the water in said receptacle.

16. An apparatus for testing tubes comprising a frame, an endless belt carrier extending lengthwise of said frame, a plurality of tube supporting devices carried by said carrier, each supporting device including opposed parts to engage and seal the respective ends of the tube, one of said parts being movable toward and from the other part, a water receptacle supported below and adjacent to the upper stretch of said carrier, said frame having between its ends means to support said upper stretch of said carrier and guide said parts of said tube supporting devices through the water in said receptacle, means for positioning tubes for engagement by said tube supporting devices as the latter approach said receptacle, means for actuating the movable part of each tube supporting device to cause the latter to pick up a tube on said positioning means and move the same through the water in said receptacle, means controlled by the movement of said carrier for actuating said movable part to release said tube at a point of discharge beyond said receptacle, means for connecting the interior of said tube with a source of air under pressure as it approaches said receptacle and for interrupting said connection as said tube moves beyond said receptacle, and manually controlled means for actuating said movable part to release said tube at a different point of discharge.

17. An apparatus for testing tubes comprising a frame, an endless belt carrier extending lengthwise of said frame, a plurality of tube supporting devices carried by said carrier, each supporting device including opposed parts to engage and seal the respective ends of the tube, one of said parts being movable toward and from the other part, a water receptacle supported below and adjacent to the upper stretch of said carrier, said frame having a substantially horizontal member provided between its ends with a depressed portion to support said upper stretch of said carrier and guide said parts of said tube supporting devices through the water in said receptacle, means for positioning tubes for engagement by said tube supporting devices as the latter approach said receptacle, spring means urging the movable part of each supporting device toward the opposed part of said device, a retracting member carried by each movable part, a fixed cam arranged to be engaged by said retracting member and to retract said movable part to enable the latter to move into line with a tube on said positioning means and to then release the same for movement by said spring means into engagement with said tube, a cam arranged beyond said receptacle for engagement by said retracting member to release said tube, means for connecting the interior of said tube with a source of air under pressure as it approaches said receptacle and for interrupting said connection as said tube moves beyond said receptacle, additional and normally inoperative means for retracting said movable part to release said tube at a different point of discharge, and a manually operated device carried by said tube supporting device to interrupt the connection between said tube and said air source and to render said normally inoperative retracting means operative.

18. An apparatus for testing tubes comprising a frame, an endless belt carrier extending lengthwise of said frame, a plurality of tube supporting devices carried by said carrier, each supporting device including offset parts arranged to project beneath the path of the upper stretch of said carrier and opposed one to the other to engage and seal the respective ends of the tube, one of said parts being movable toward and from the other part, a water receptacle supported below and adjacent to the upper stretch of said carrier, said frame having a substantially horizontal member provided between its ends with a depressed portion to support said upper stretch of said carrier and guide said parts of said tube supporting devices through the water in said receptacle, means for positioning tubes for engagement by said tube supporting devices as the latter approach said receptacle, means for actuating the movable part of said tube supporting device to cause the latter to pick up a tube on said positioning means and move the same through the water in said receptacle, means controlled by the movement of said carrier for actuating said movable part to release said tube at a point of discharge beyond said receptacle, means for connecting the interior of said tube with a source of air under pressure as it approaches said receptacle and for interrupting said connection as said tube moves beyond said receptacle, and manually controlled means for actuating said movable part to release said tube at a different point of discharge.

19. An apparatus for testing tubes comprising a frame, shafts journaled in said frame adjacent the respective ends thereof, a pair of sprocket wheels secured to each shaft, sprocket chains extending about the corresponding sprocket wheels on the two shafts, a plurality of tube supporting devices each comprising members mounted on the respective chains and having opposed parts to engage and seal the respective ends of a tube, one of said parts being movable toward and from the other part and having an air duct, spring means urging said movable part toward said other part, a retracting member connected with said movable part, a water receptacle supported between and at a lower level than the upper stretches of said chains, said frame having longitudinal members provided between their ends with depressed portions to support said upper stretches of the respective chains and guide said parts of said tube supporting devices through the water in said receptacle, a tube positioning device including disks mounted on one of said shafts and having a plurality of pairs of alined notches, means for feeding tubes to said positioning device, a fixed cam adjacent said shaft to engage the retracting members of the respective tube supporting devices and retract said movable parts as they move into alinement with a tube on said positioning device and to release the same for movement into engagement with said tube as the latter is advanced by said positioning device, a cam mounted adjacent the other shaft to engage said retracting members and release said tubes at a normal point of discharge, means for connecting the air duct in each movable part with a source of air under pressure as said movable part moves from said positioning device to said receptacle and for disconnecting the same from said air source as said movable part moves beyond said receptacle, a normally inoperative retracting member connected with the movable part of each tube supporting device, manually operated means carried by each tube supporting device for interrupting the connection between said air duct and said air source and for moving said inoperative retracting member to an operative position, and a part supported on said frame to engage said last mentioned retracting member and release said tube at a different point of discharge.

20. An apparatus for testing tubes comprising a frame, shafts journaled in said frame adjacent the respective ends thereof, a pair of sprocket wheels secured to each shaft, sprocket chains extending about the corresponding sprocket wheels on the two shafts, a plurality of tube supporting devices each comprising members mounted on the respective chains and having opposed parts to engage and seal the respective ends of a tube, one of said parts being movable toward and from the other part and having an air duct, spring means urging said movable part toward said other part, a retracting member connected with said movable part, a water receptacle supported between and at a lower level than the upper stretches of said chains, said frame having longitudinal members provided between their ends with depresed portions to support said upper stretches of the respective chains and guide said parts of said tube supporting devices through the water in said receptacle, a tube positioning device including disks mounted on one of said shafts and having a plurality of pairs of alined notches, means for feeding tubes to said positioning device, a fixed cam adjacent said shaft to engage the retracting members of the respective tube supporting devices and retract said movable parts as they move into alinement with a tube on said positioning device and to release the same for movement into engagement with said tube as the latter is advanced by said positioning device, a cam mounted adjacent the other shaft to engage said retracting members and release said tubes at a normal point of discharge, means for connecting the air duct in each movable part with a source of air under pressure as said movable part moves from said positioning device to said receptacle and for disconnecting the same from said air source as said movable part moves beyond said receptacle, a normally inoperative retracting member connected with the movable part of each tube supporting device, manually operated means carried by each tube supporting device for interrupting the connection between said air duct and said air source and for moving said inoperative retracting member to an operative position, a part supported on said frame to engage said last mentioned retracting member and release said tube at a different point of discharge, and a fixed part adjacent the first mentioned shaft for restoring said last mentioned retracting member to its inoperative position.

21. A tube supporting device for a tube testing apparatus, comprising a housing adapted to be secured to a carrier and having top and bottom walls provided with slots, a member slidably mounted in said housing, having at one end of said housing a tube engaging part and having adjacent the other end of said housing a retracting element extending beyond said bottom wall, means urging said member to tube engaging position, a second retracting element slidably mounted in said member, extending through said slots in said housing and supported normally with its lower end adjacent the bottom of said housing, and means carried by said device for actuating said second retracting element to project said lower end thereof to retracting position below the bottom of said housing.

22. A tube supporting device for a tube testing apparatus, comprising a housing adapted to be secured to a carrier and having top and bottom walls provided with slots, a member slidably mounted in said housing, having at one end of said housing a tube engaging part and having adjacent the other end of said housing a retracting element extending beyond said bottom wall, means urging said member to tube engaging position, a second retracting element slidably mounted in said member, extending through said slots in said housing and supported normally with its lower end adjacent the bottom of said housing, said member having an air duct extending through the tube engaging part thereof, and means for connecting said duct with a source of supply of air under pressure, means for actuating said second retracting element to project the lower end thereof to retracting position below the bottom of said housing and for interrupting the flow of air through said duct.

23. A tube supporting device for a tube testing apparatus, comprising a housing adapted to be secured to a carrier and having top and bottom walls provided with slots, a member slidably mounted in said housing, having at one end of said housing a tube engaging part and having at the other end of said housing a retracting element extending beyond said bottom wall, spring means for moving said member to tube engaging position, said member also having an air duct extending through said tube engaging part and a vertical bore in line with said slots and intersecting said air duct, means for connecting said duct with a source of air under pressure, a second retracting element slidably mounted in said bore, extending through said slots, having a transverse port, and supported normally with said port in line with said air duct and with the lower end of said element adjacent the bottom of said member, and a manually operable device mounted on said slidable member to depress said second retracting element and thereby move the same to retracting position and close said air duct.

24. In an apparatus for testing tubes, a water receptacle, an endless carrier having a plurality of devices to separately support tubes thereon and arranged to successively submerge said tubes in the water in said receptacle, each tube supporting device including a part movable into and out of supporting engagement with a tube, and means for sealing the ends of said tube and introducing air under pressure into the same, means including a device mounted adjacent one end of said receptacle for moving the movable part of said supporting device into engagement with a tube as said supporting device approaches said receptacle, means adjacent the other end of said receptacle for disengaging said movable part from said tube and thereby releasing the latter, and means separate from said disengaging means for disengaging said movable part from said tube at a different point in the travel of said carrier and including a device supported in a fixed position adjacent said carrier, a normally inoperative member carried by said movable part, and manually operable means for moving said member to an operative position with relation to said fixed device.

25. In an apparatus for testing tubes, an endless carrier, a plurality of tube supporting devices carried by said carrier, each supporting device having opposed parts to engage and seal the respective ends of a tube and constituting the sole means for supporting said tube on said carrier, one of said parts being movable toward and from the other part and having an air duct communicating with the tube engaged thereby, yieldable means constantly urging said movable part toward said other part, a water receptacle supported below a portion of the path of said carrier, means for actuating said carrier to cause the tubes carried thereby to be successively submerged in the water in said receptacle, means mounted on a fixed support in advance of said receptacle for positioning a tube between the paths of the aforesaid parts of said tube supporting devices, means for delivering tubes to said positioning means, means controlled by the movement of said carrier to cause the movable part of each tube supporting device to operatively engage the adjacent end of a tube in said position and move the other end of said tube into sealing engagement with the opposed part of said device and for retracting said movable part to release said tube at a point of discharge beyond said receptacle, means operating in timed relation to the movement of said carrier to connect said air duct with a source of air under pressure after said movable part has engaged a tube, to maintain said connection while said tube is submerged and to interrupt said connection when said tube is withdrawn from said receptacle, whereby the escape of air through a leak in said tube will cause a visible agitation of the water, and manually controlled means to cause said movable part to be retracted to release said tube at a different point of discharge.

EMILE BLAIR.